US011063450B2

(12) United States Patent
Williams et al.

(10) Patent No.: US 11,063,450 B2
(45) Date of Patent: Jul. 13, 2021

(54) SYSTEM AND METHOD FOR CLOSED-TRANSITION TRANSFER OF DC BATTERY BANKS ON A GRID SCALE BATTERY ENERGY STORAGE SYSTEM

(71) Applicant: S&C Electric Company, Chicago, IL (US)

(72) Inventors: Stephen E Williams, Franklin, WI (US); David G Porter, East Troy, WI (US)

(73) Assignee: S&C Electric Company, Chicago, IL (US)

( * ) Notice: Subject to any disclaimer, the term of this patent is extended or adjusted under 35 U.S.C. 154(b) by 300 days.

(21) Appl. No.: 16/405,391

(22) Filed: May 7, 2019

(65) Prior Publication Data

US 2020/0076208 A1    Mar. 5, 2020

Related U.S. Application Data

(60) Provisional application No. 62/725,325, filed on Aug. 31, 2018.

(51) Int. Cl.
| | | |
|---|---|---|
| *H02J 7/00* | (2006.01) | |
| *H01M 10/0525* | (2010.01) | |
| *H01M 10/44* | (2006.01) | |
| *H02J 3/32* | (2006.01) | |

(52) U.S. Cl.
CPC ....... *H02J 7/0024* (2013.01); *H01M 10/0525* (2013.01); *H01M 10/441* (2013.01); *H02J 3/32* (2013.01); *H02J 7/0014* (2013.01); *H02J 7/0021* (2013.01); *H01M 2220/10* (2013.01)

(58) Field of Classification Search
CPC ...... H02J 7/0024; H02J 7/0014; H02J 7/0021; H02J 3/32; H02J 1/08; H02J 7/34; H02J 1/10; H01M 10/0525; H01M 10/441; H01M 2220/10; Y02E 60/10
See application file for complete search history.

(56) References Cited

U.S. PATENT DOCUMENTS

| | | | | |
|---|---|---|---|---|
| 2011/0140530 A1* | 6/2011 | Demetriades | ............. | H02J 3/36 307/77 |
| 2015/0288212 A1* | 10/2015 | Kim | ......................... | H02H 3/24 307/80 |
| 2016/0082907 A1* | 3/2016 | Dong | .................. | H02M 3/1582 307/9.1 |
| 2016/0241057 A1* | 8/2016 | Yang | ....................... | H02J 9/062 |

(Continued)

*Primary Examiner* — Nha T Nguyen

(57) ABSTRACT

An energy storage system comprising a main bus, a transfer bus, and a pair of anti-parallel thyristors electrically coupled to the main bus and the transfer bus. The system also includes a first and second group of battery cells electrically coupled to the main bus and the transfer bus, and a switching network including a plurality of switches that selectively connect the first and second groups of battery cells to the main bus and the transfer bus. A controller controls the position of the switches and a bias voltage applied to the first and second thyristors so as to seamlessly transition power from the first group of battery cells to the second group of battery cells when the group of battery cells are being discharged and seamlessly transition power between the first group of battery cells and the second group of battery cells when the battery cells are being charged.

20 Claims, 1 Drawing Sheet

(56) References Cited

U.S. PATENT DOCUMENTS

| | | | |
|---|---|---|---|
| 2017/0237128 A1* | 8/2017 | Kubo | H02J 7/0025 |
| | | | 429/7 |
| 2017/0373531 A1* | 12/2017 | Xu | H02J 1/10 |
| 2018/0041029 A1* | 2/2018 | Keruel | B65D 55/06 |
| 2018/0076644 A1* | 3/2018 | Qureshi | H02J 7/0013 |
| 2019/0199127 A1* | 6/2019 | Gavrilov | H02J 9/062 |
| 2020/0295595 A1* | 9/2020 | Shigeta | H02J 9/062 |
| 2021/0041507 A1* | 2/2021 | Eliassen | H02H 3/16 |

* cited by examiner

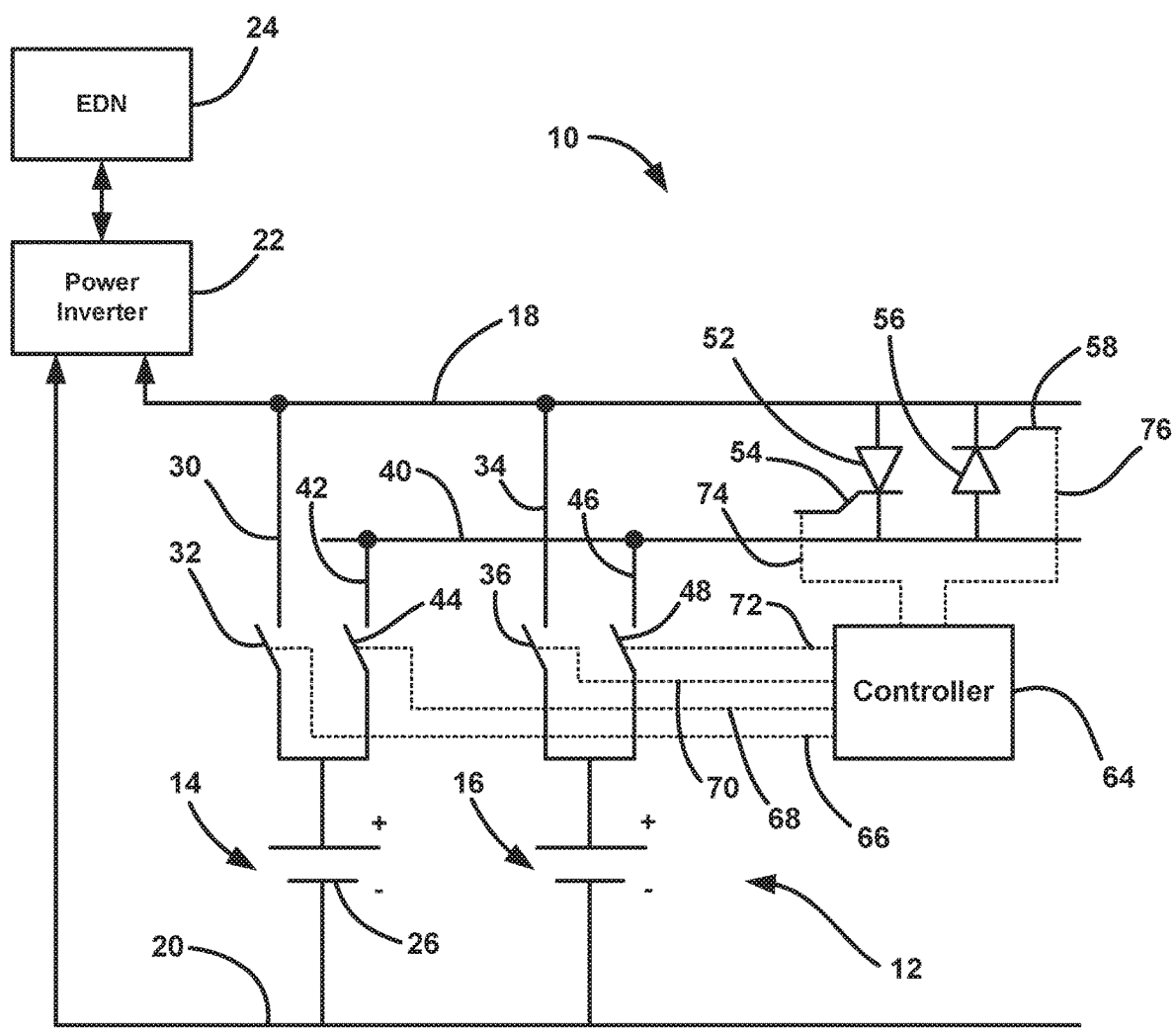

SYSTEM AND METHOD FOR CLOSED-TRANSITION TRANSFER OF DC BATTERY BANKS ON A GRID SCALE BATTERY ENERGY STORAGE SYSTEM

CROSS-REFERENCE TO RELATED APPLICATION

This application claims the benefit of priority from the U.S. Provisional Application No. 62/725,325, filed on Aug. 31, 2018, the disclosure of which is hereby expressly incorporated herein by reference for all purposes.

BACKGROUND

Field

This disclosure relates generally to a grid scale battery energy storage system including a switching network for seamlessly switching a number of battery groups to and from an electrical power distribution network and, more particularly, to a grid scale battery energy storage system including a switching network for seamlessly switching a number of battery groups to and from an electrical power distribution network, where the switching network includes a plurality of switches and a pair of anti-parallel thyristors for directing power to and from the battery groups between a main electrical bus and a transfer bus.

Discussion of the Related Art

An electrical power distribution network, often referred to as an electrical grid, typically includes a number of power generation plants each having a number of power generators, such as gas turbine engines, nuclear reactors, coal-fired generators, hydro-electric dams, etc. The power plants provide a high voltage AC signal on high voltage transmission lines that deliver electrical power to a number of substations typically located within a community, where the voltage is stepped down to a medium voltage. The substations provide the medium voltage power to a number of feeder lines. The feeder lines are coupled to a number of lateral lines that provide the medium voltage to various transformers, where the voltage is stepped down to a low voltage and is provided to a number of loads, such as homes, businesses, etc.

It is becoming increasing popular to employ battery energy storage systems in an electrical power distribution network, such as at the substations, that include a bank or array of batteries that are able to store electrical energy for distribution onto the network. These energy storage systems are generally coupled to a medium voltage AC electrical line through a power inverter that operates to convert the DC voltage from the batteries to an AC voltage where it is then stepped up to a medium voltage to provide electrical power on the feeder lines to the various loads that the network services. Additionally, the power inverter will convert the AC voltage provided by the power generation devices in the plant to a DC voltage to charge the batteries when necessary and appropriate. Thus, the battery energy storage system can provide energy to the network during those times when the demand for energy is high to supplement the electrical power, and can be charged during those times when the energy demand is low.

Various battery chemistries, such as lead-acid, sodium-sulfur, nickel-metal hydride, etc., can be used for the batteries in these types of grid scale battery energy storage systems. However, more modern battery chemistries, such as lithium-ion batteries, have become the preferred battery type in these energy storage systems because of their power efficiency. These types of modern battery chemistries typically have a much lower impedance than other battery chemistries, which results in a high short-circuit current often approaching an order of magnitude greater than the previous battery types for a given amount of energy capacity. Thus, an electrical fault in the DC network that could create such a high current short circuit that the electrical system may not be able to clear.

A typical desired battery capacity often includes providing many hours of energy at the desired rate of power. In order to achieve the desired capacity, a number of battery arrays each including multiple battery cells are electrically coupled through switching networks in a storage system, where a high current short circuit could exceed the switching capability of the switching networks. For example, the interconnected electrical components between the battery array and the inverter may be rated at a certain maximum current that cause certain circuit breakers to switch, which may not be suitable for the amount of short-circuit current the batteries can accept. Further, because of the sensitivity of these types of modern battery chemistries, manufacturers often require that if a fault occurs causing a short-circuit, all of the batteries that are associated with the circuit for that fault need to be replaced. Thus, it is desirable to configure the larger battery arrays into smaller groups of battery cells that can be electrically isolated, which provides the desired rate of power, but are electrically separated in the event of a fault.

It is known in the art to limit the short-circuit current by employing an open transition configuration that includes separating the battery array into two or more circuits that are not interconnected. This requires separately discharging or charging one of the battery array circuits, and then disconnecting that battery array circuit from the inverter, where the next battery array circuit is connected to the inverter for charging or discharging purposes. However, this requires that the energy storage system be shutdown during the transition between circuits for a short period of time. If mechanical switching devices are employed to partition the battery array, available fault currents may be effectively limited, but open transition transfers must be used to limit high magnitude circulating currents between the battery groups having substantially different state of charges (SOC). However, open transition transfer requires the energy storage system to effectively reduce its output or input power to zero on the affected inverter while the outgoing battery group is disconnected and the incoming battery group is connected. For certain applications, such a momentary power outage is unacceptable.

SUMMARY

The present disclosure describes a grid scale battery energy storage system including a switching network for seamlessly switching a number of battery groups onto and off of an electrical power distribution network. The system includes a main bus, a transfer bus, a first thyristor electrically coupled to the main bus and the transfer bus in a configuration that allows current flow from the transfer bus to the main bus in a forward bias direction if a gate bias is applied to the first thyristor and prevents current flow from the main bus to the transfer bus, and a second thyristor electrically coupled to the main bus and the transfer bus and in a configuration that allows current flow from the main bus to the transfer bus if a gate bias is applied to the second thyristor and prevents current flow from the transfer bus to the main bus. The system also includes a first group of battery cells electrically coupled to the main bus on a first main bus connector line and electrically coupled to the transfer bus on a first transfer bus connector line, and a second group of battery cells electrically coupled to the main bus on a second main bus connector line and electrically coupled to the transfer bus on a second transfer bus connector line. The system further includes a first switch provided in the first main bus connector line and being operable to connect and disconnect the first group of battery cells to and from the main bus, a second switch provided in the second main bus connector line and being operable to disconnect and connect the second group of battery cells to and from the main bus, a third switch provided in the first transfer bus connector line and being operable to connect and disconnect the first group of battery cells to and from the transfer bus, and a fourth switch provided in the second transfer bus connector line and being operable to connect and disconnect the second group of battery cells to and from the transfer bus. A controller controls the position of the first, second, third and fourth switches and the bias on the first and second thyristors so as to seamlessly transition power from the first group of battery cells to the second group of battery cells when the group of battery cells are being discharged and seamlessly transition power between the first group of battery cells and the second group of battery cells when the battery cells are being charged.

Additional features of the embodiments will become apparent from the following description and appended claims, taken in conjunction with the accompanying drawings.

BRIEF DESCRIPTION OF THE DRAWING

FIG. 1 is a schematic diagram of a grid scale battery energy storage system that includes a switching network for seamlessly connecting multiple battery groups to a main bus using a transfer bus.

DETAILED DESCRIPTION OF THE EMBODIMENTS

The following discussion of the various embodiments directed to a grid scale battery energy storage system including a switching network for seamlessly switching a number of battery groups to and from an electrical power distribution network is merely exemplary in nature, and is in no way intended to limit the disclosure. For example, as mentioned, the disclosure as described is employed in a grid scale battery energy storage system. However, as will be appreciated by those skilled in the art, the switching network of the invention may have other applications.

As will be discussed in detail below, the present disclosure proposes a grid scale battery energy storage system that includes a switching network that selectively and seamlessly connects groups of batteries to a main electrical bus or a transfer electrical bus based on the direction of current flow and the voltages of the battery groups to provide a seamless closed transition transfer between the groups of batteries at different voltages without high magnitude transient currents flowing between the battery groups.

FIG. 1 is a schematic diagram of a grid scale battery energy storage system 10 including a battery array 12 having a certain number of battery groups, such as battery groups 14 and 16, where each battery group 14 and 16 includes a certain number of series or parallel connected battery cells 26 having a certain battery chemistry. The battery cells 26 can be any suitable battery cell for the purposes described herein, and typically will be lithium-ion battery cells. The number of the battery cells 26 in each of the battery groups 14 and 16 and the number of the battery groups in the battery array 12 can be any suitable number for any energy storage system configuration to provide the desired amount of electrical power for a particular application.

The battery array 12 provides electrical power on a main system bus 18 and associated negative common bus 20 to a power inverter 22 that converts the DC battery voltage to an AC voltage suitable to be provided on an electrical distribution network (EDN) 24. The battery array 12 may be electrical coupled to the bus 20 through a switching network. The EDN 24 is intended to represent all of the electrical system components for any suitable medium voltage power distribution network that can receive electrical power from the energy storage system 10 including, but not limited to, electrical substations, voltage step up and step down transformers, feeder lines, voltage regulators, lateral lines, loads, etc. Further, the power inverter 22 is operable to receive an AC voltage from the EDN 24 and convert it to a DC voltage suitable to charge the battery cells 26 in the battery array 12. Any suitable battery management system (not shown) can be employed to control the discharge and charge for the proper SOC of the battery cells within the scope of the present disclosure.

It is generally desirable that the battery groups 14 or 16 provide continuous power to the main bus 18 to provide a continuity of supply voltage. However, if the battery groups 14 and 16 are at significantly different voltages and they are connected together by, for example, the main bus 18, there could be a high current flow through the battery groups 14 and 16, which could create some of the problems referred to above.

The battery group 14 is electrically coupled to the main bus 18 on line 30 through a switch 32 and the battery group 16 is electrically coupled to the main bus 18 on line 34 through a switch 36. Additionally, the battery group 14 is electrically coupled to a transfer bus 40 on line 42 through a switch 44 and the battery group 16 is electrically coupled to the transfer bus 40 on line 46 through a switch 48. A first thyristor 52 is electrically coupled to the main bus 18 and the transfer bus 40 that allows current flow from the main bus 18 to the transfer bus 40 when a bias voltage is applied to a gate terminal 54 of the thyristor 52, but does not allow current flow from the transfer bus 40 to the main bus 18. Additionally, an anti-parallel second thyristor 56 is coupled to the transfer bus 40 and the main bus 18 that allows current flow from the transfer bus 40 to the main bus 18 when a bias voltage is provided to a gate terminal 58 of the thyristor 56, but does not allow current flow from the main bus 18 to the transfer bus 40. The switches 32, 36, 44 and 48 can be any suitably rated contactor, load switch or circuit breaker. The thyristors 52 and 56 can be a power electronic switch or a suitably designed thyristor switch of this type. The collection of switches, buses and thyristors can be packaged in a DC switch board enclosure and configuration.

The system 40 includes a controller 64 that controls the position of the switch 32 on control line 66, the position of the switch 44 on control line 68, the position of the switch 36 on control line 70 and the position of the switch 48 on control line 72. Additionally, the controller 64 allows current flow from the main bus 18 to the transfer bus 40 through the thyristor 52 by providing a bias voltage on control line 74 to the gate terminal 54. Likewise, the controller 64 allows current flow from the transfer bus 40 to the main bus 18 through the thyristor 56 by providing a bias voltage on control line 76 to the gate terminal 58. As will be discussed in detail below, by operating the switches 32, 36, 44 and 48 and the thyristors 52 and 56 in a proper control sequence based on the voltages of the battery groups 14 and 16, and considering the direction of current flow to and from the battery groups 14 and 16, a seamless closed transition transfer can be affected without high magnitude transient currents flowing between the battery groups 14 and 16. In other words, the system 10 prevents high fault currents in the battery groups 14 and 16 without disconnecting them from the main bus 18 by providing an operational sequence of the switches 32, 36, 44 and 48 and the thyristors 52 and 56 for each of the possible combinations of relative voltages between the battery groups 14 and 16, the direction of current flow and incoming/outgoing group transition.

In one control sequence example, the battery group 14 is providing power to the main bus 18 and the battery group 16 is not. When the battery group 14 becomes discharged and the battery group 16 is fully charged, the controller 64 will switch the power provided to the bus 18 from the battery group 14 to the battery group 16 without causing a high current flow as a result of the voltage V1 of the battery group 14 being less than the voltage V2 of the battery group 16. In the initial configuration, the switch 32 is closed to allow the battery group 14 to be coupled directly to the main bus 18, the switches 36, 44 and 48 are open and the thyristors 52 and 56 are not biased so current flow is prevented between the main bus 18 and the transfer bus 40.

The first step in the sequence for transferring power to the bus 18 from the battery group 14 to the battery group 16 includes closing the switch 44 on the control line 68 and applying a bias voltage on the control line 74 to the gate terminal 58 to energize the thyristor 56 so that current flow from the battery group 14 can flow to the main bus 18 along two paths, namely, the lines 30 and 42. After a short stabilization period, the switch 32 is opened on the line 66, which provides a soft switching operation because current from the battery group 14 will flow through the line 42 to the transfer bus 40 and then to the main bus 18 through the thyristor 56. Next, the switch 36 is closed on the line 70 to connect the battery group 16 to the main bus 18 on the line 34. Since the voltage V2 is greater than the voltage V1, the thyristor 56 becomes reverse-biased, which prevents current flow from the battery group 14 to the transfer bus 40 and to the main bus 18 through the thyristor 56. Now that current is flowing from the battery group 16 to the main bus 18, the bias voltage applied to the gate terminal 58 is removed and the switch 44 is opened, which is a soft switching operation since no current is flowing through the reverse-biased thyristor 56. Thus, a seamless power transition is provided.

The same operation can be performed when switching from the battery group 16 to the battery group 14, when the battery group 16 is depleted and the battery group 14 is fully charged. Specifically, the control sequence first closes the switch 48 and applies a bias voltage to the gate terminal 58 to energize the thyristor 56 so that current from the battery group 16 can flow to the main bus 18 along two paths, namely, the lines 34 and 46. After a short stabilization period, the switch 36 is opened which provides a soft switching operation because current will flow through the line 46 to the transfer bus 40 and then to the main bus 18 through the thyristor 56. Next, the switch 32 is closed to connect the battery group 14 to the main bus 18 on the line 30. Since the voltage V1 is greater than the voltage V2, the thyristor 56 becomes reverse-biased, which prevents current flow from the transfer bus 40 to the main bus 18 through the thyristor 56. Now that current is flowing from the battery group 14 to the main bus 18, the bias voltage applied to the gate terminal 58 is removed and the switch 48 is opened, which is a soft switching operation since no current is flowing through the reverse-biased thyristor 56.

A different control sequence is provided when the battery groups 14 and 16 are being charged by the EDN 24, where a fully charged battery group is disconnected from the main bus 18 and a discharged battery group is then connected to the main bus 18 for charging. In another control sequence example, the battery group 14 has been fully charged, and thus has a higher voltage V1 than the discharged battery group 16 having voltage V2. The switch 32 is closed when the battery group 14 is charging, and the other switches 44, 36 and 48 are open and the thyristors 52 and 56 are not biased. This sequence is nearly the same as the sequence for switching between the battery groups 14 and 16 when discharging, as discussed above, but where the thyristor 52 is used to allow current flow from the main bus 18 to the transfer bus 40. Specifically, the switch 44 is closed and a bias voltage is applied to the gate terminal 54 of the thyristor 52 to allow two current paths to charge the battery group 14, namely, on the lines 30 and 42. Next, the switch 32 is opened so that current can only flow to the battery group 14 through the transfer bus 40. Next, the switch 36 is closed to connect the battery group 16 to the main bus 18, and since the voltage V1 of the battery group 14 is greater than the voltage V2 of the battery group 16, the thyristor 52 becomes reverse-biased, and current only flows from the bus 18 through the switch 36 on the line 34 to the battery group 16. Once the system is stabilized, the switch 44 is opened and the bias voltage applied to the gate terminal 54 is removed.

The same basic operation can be employed if the battery group 16 is fully charged, and the charging sequence is switched to charge the battery group 14. Specifically, the switch 48 is closed and a bias voltage is applied to the gate terminal 54 of the thyristor 52 to allow two current paths to charge the battery group 16, namely, on the lines 34 and 46. Next, the switch 36 is opened so that current can only flow to the battery group 16 through the transfer bus 40. Next, the switch 32 is closed to connect the battery group 14 to the main bus 18, and since the voltage V2 of the battery group 16 is greater than the voltage V1 of the battery group 14, the thyristor 52 becomes reverse-biased, and current only flows from the bus 18 through the switch 32 on the line 30 to the battery group 14. Once the system is stabilized, the switch 48 is opened and the bias voltage applied to the gate terminal 54 is removed.

It is generally necessary to monitor the temperature of a lithium-ion battery so as to prevent any of the battery cells therein from getting too hot and causing undesirable consequences. Lithium-ion batteries typically employ sophisticated battery management systems to monitor the temperature, voltage and current of the battery cells to prevent such occurrences. Therefore, even if one battery group is operating at a higher voltage than another battery group, it may have a battery cell that is operating less efficiently than the rest of the cells, and getting too hot, where it may be desirable to switch the connection to the bus 18 from the high voltage battery group to the low voltage battery group as the system is being charged. The following control sequence describes the operation where this situation may be occurring and a higher voltage battery group needs to be disconnected from the main bus 18 and a lower voltage battery group needs to be connected to the main bus 18 in a seamless transition.

In another control sequence example, the battery group 14 is being discharged to the bus 18, and the voltage V1 of the battery group 14 is greater than the voltage V2 of the battery group 16 and is providing power on the line 30 to the main bus 18 through the closed switch 32, where the switches 36, 44 and 48 are open and the thyristors 52 and 56 are not biased. First, the switch 48 is closed and a bias voltage is applied to the gate terminal 58 of the thyristor 56, but no current flows from the battery group 16 to the main bus 18 through the transfer bus 40 because the thyristor 56 is reverse-biased as a result of the higher voltage V1 provided by the battery group 14. Next, the switch 32 is opened to disconnect the battery group 14 from the main bus 18, which causes the thyristor 56 to become forward biased and allow current flow from the battery group 16 through the transfer bus 40 to the main bus 18 on the line 46. Next, the switch 36 is closed to directly connect the battery group 16 to the main bus 18, and after a short time the switch 48 is opened to disconnect the battery group 16 from the transfer bus 40 and the bias voltage is removed from the gate terminal 58 of the thyristor 56.

The same basic control sequence can be performed when switching from the battery group 16 to the battery group 14 during battery discharge when the voltage V2 of the battery group 16 is greater than the voltage V1 of the battery group 14. The sequence starts with the switch 36 being closed and the switches 32, 44 and 48 being opened. The transfer starts when the switch 44 is closed and a bias voltage is applied to the gate terminal 58 of the thyristor 56, but no current flows from the battery group 14 to the main bus 18 through the transfer bus 40 because the thyristor 56 is reverse-biased as a result of the higher voltage V2 provided by the battery group 16. Next, the switch 36 is opened to disconnect the battery group 16 from the main bus 18, which causes the thyristor 56 to become forward biased and allow current flow from the battery group 14 through the transfer bus 40 to the main bus 18 on the line 42. Next, the switch 32 is closed to directly connect the battery group 14 to the main bus 18, and the switch 44 is opened to disconnect the battery group 14 from the transfer bus 40 and the bias voltage is removed from the gate terminal 58 of the thyristor 56.

The following discussion describes the control sequence for when the battery groups 14 and 16 are being charged by the EDN 24, but where a lower charged battery group is removed from the bus 18 and a higher charged battery group is connected to the bus 18, and is further charged. This sequence is virtually the same as the sequence for switching between the battery groups 14 and 16 when discharging, as discussed above, but where the thyristor 52 is used to allow current flow from the main bus 18 to the transfer bus 40. In another control sequence example, the battery group 14 is being charged and has a lower voltage V1 than the battery group 16 having voltage V2, but a hot cell in the battery group 14 requires that it be removed from the bus 18. The switch 32 is closed when the battery group 14 is charging, and all of the switches 44, 36 and 48 are open and the thyristors 52 and 56 are not biased. First, the switch 48 is closed and a bias voltage is applied to the gate terminal 54 of the thyristor 52, but no current flows from the main bus 18 to the battery group 16 through the transfer bus 40 because the thyristor 52 is reverse-biased as a result of the higher voltage V1 provided by the battery group 14. Next, the switch 32 is opened to disconnect the battery group 14 from the main bus 18, which causes the thyristor 52 to become forward biased and allow current flow from the bus 18 to the battery group 16 through the transfer bus 40 on the line 46. Next, the switch 36 is closed to directly connect the battery group 16 to the main bus 18 for charging, and the switch 48 is opened to disconnect the battery group 16 from the transfer bus 40 and the bias voltage is removed from the gate terminal 54 of the thyristor 52.

The same basic control sequence can be performed when switching from the battery group 16 to the battery group 14 during charging when the voltage V2 of the battery group 16 is greater than the voltage V1 of the battery group 14. The switch 36 is closed when the battery group 16 is charging, and all of the switches 32, 44 and 48 are open and the thyristors 52 and 56 are not biased. The sequence starts when the switch 44 is closed and a bias voltage is applied to the gate terminal 54 of the thyristor 52, but no current flows from the bus 18 to the battery group 16 through the transfer bus 40 because the thyristor 52 is reverse-biased as a result of the higher voltage V2 provided by the battery group 16. Next, the switch 36 is opened to disconnect the battery group 16 from the main bus 18, which causes the thyristor 52 to become forward biased and allow current flow from the main bus 18 to the battery group 14 through the transfer bus 40 on the line 42. Next, the switch 32 is closed to directly connect the battery group 14 to the main bus 18, and the switch 44 is opened to disconnect the battery group 14 from the transfer bus 40 and the bias voltage is removed from the gate terminal 54 of the thyristor 52.

An alternate control scheme to that discussed above can be provided when discharging the batteries to the bus 18 and switching from the battery group 14 to the battery group 16 when the voltage V1 is less than the voltage V2. In this control scheme, both of the thyristors 52 and 56 are biased and unbiased at the same time. In the initial configuration, the switch 32 is closed, the switches 36, 44 and 48 are open, and the thyristors 52 and 56 are not biased, where power from the battery group 14 is flowing directly onto the main bus 18. As above, the switch 44 is closed, but the gate terminals 54 and 58 of both of the thyristors 52 and 56 are biased so that current flows from the battery group 14 through the transfer bus 40 and onto the main bus 18 through the thyristor 56, where the thyristor 52 is reverse-biased because of the higher voltage V2. The switch 32 is then opened to disconnect the battery group 14 from the main bus 18, which is a soft switching operation because current flows through the transfer bus 40 and the thyristor 56 to the main bus 18 on the line 42. The gate biases are then removed from the thyristors 52 and 56, where the thyristor 56 remains forward biased and the thyristor 52 is reverse-biased. The switch 36 is then closed to connect the battery group 16 to the main bus 18, and since the voltage V2 is greater than the voltage V1, the thyristor 56 becomes reverse-biased and the thyristor 52 blocks forward current since it is not biased. The switch 44 is then opened to remove the battery group 14 from the transfer bus 40.

The same basic control scheme to that discussed above can be provided to disconnect the battery group 16 from the main bus 18 and connect the battery group 14 to the main bus 18 when the voltage V2 is less than the voltage V1. For the initial configuration, the switch 36 is closed, the switches 32, 44 and 48 are open, and the thyristors 52 and 56 are not biased, where power from the battery group 16 is flowing directly onto the main bus 18. As above, the switch 48 is closed, and the gate terminals 54 and 58 of both of the thyristors 52 and 56 are biased so that current flows from the battery group 16 through the transfer bus 40 and onto the main bus 18 through the thyristor 56, where the thyristor 52 is reverse-biased because of the higher voltage V1. The switch 36 is then opened to disconnect the battery group 16 directly from the main bus 18, which is a soft switching operation because current still flows through the transfer bus 40 and the thyristor 56 to the main bus 18 on the line 46. The gate biases are then removed from the thyristors 52 and 56, where the thyristor 56 remains forward biased and the thyristor 52 is reverse-biased. The switch 32 is then closed to connect the battery group 14 to the main bus 18, and since the voltage V1 is greater than the voltage V2, the thyristor 56 becomes reverse-biased and the thyristor 52 blocks forward current since it is not biased. The switch 48 is then opened to remove the battery group 16 from the transfer bus 40.

This alternate control scheme can be used when charging the battery groups 14 and 16 through the bus 18. In another control sequence example, the battery group 14 has been fully charged, and thus has a higher voltage V1 than the discharged battery group 16 having voltage V2. The switch 32 is closed when the battery group 14 is charging, and all of the other switches 36, 44 and 48 are open and the thyristors 52 and 56 are not biased. This sequence is basically the same as the sequence for switching between the battery groups 14 and 16 when discharging the groups 14 and 16, as discussed above. The switch 44 is closed and a bias voltage is applied to the gate terminals 54 and 58 of the thyristors 52 and 56 to allow two current paths to charge the battery group 14, namely, on the lines 30 and 42, where the thyristor 56 is reverse-biased because of the higher voltage V1. Next, the switch 32 is opened so that current can only flow to the battery group 14 through the transfer bus 40. The gate biases are then removed from the thyristors 52 and 56, where the thyristor 56 remains forward biased and the thyristor 52 is reverse-biased. Next, the switch 36 is closed to connect the battery group 16 to the main bus 18, and since the voltage V1 of the battery group 14 is greater than the voltage V2 of the battery group 16, the thyristor 52 becomes reverse-biased, and the thyristor 56 blocks forward current since it is not biased, so current flows from the bus 18 to the battery group 16. Once the system is stabilized, the switch 44 is opened.

The same basic control scheme to that discussed above can be provided to disconnect the battery group 16 from the main bus 18 and connect the battery group 14 to the main bus 18 when the battery group 16 has been fully charged, and thus has a higher voltage V2 than the discharged battery group 14 having voltage V1. The switch 36 is closed when the battery group 16 is charging, and all of the other switches 32, 44 and 48 are open and the thyristors 52 and 56 are not biased. The switch 48 is closed and a bias voltage is applied to the gate terminals 54 and 58 of the thyristors 52 and 56 to allow two current paths to charge the battery group 16, namely, on the lines 34 and 36, where the thyristor 56 is reverse-biased because of the higher voltage V2. Next, the switch 36 is opened so that current can only flow to the battery group 16 through the transfer bus 40. The gate biases are then removed from the thyristors 52 and 56, where the thyristor 56 remains forward biased and the thyristor 52 is reverse-biased. Next, the switch 32 is closed to connect the battery group 14 to the main bus 18, and since the voltage V2 of the battery group 16 is greater than the voltage V1 of the battery group 14, the thyristor 52 becomes reverse-biased, and the thyristor 56 blocks forward current since it is not biased, so current flows from the bus 18 to the battery group 14. Once the system is stabilized, the switch 48 is opened.

The foregoing discussion discloses and describes merely exemplary embodiments. One skilled in the art will readily recognize from such discussion and from the accompanying drawings and claims that various changes, modifications and variations can be made therein without departing from the spirit and scope of the disclosure as defined in the following claims.

What is claimed is:

1. An energy storage system comprising:
   a main bus;
   a transfer bus;
   a first thyristor electrically coupled to the main bus and the transfer bus in a configuration that allows current flow from the transfer bus to the main bus in a forward bias direction if a gate bias is applied to the first thyristor and prevents current flow from the main bus to the transfer bus;
   a second thyristor electrically coupled to the main bus and the transfer bus in a configuration that allows current flow from the main bus to the transfer bus if the second thyristor is gate biased and prevents current flow from the transfer bus to the main bus;
   a first group of battery cells electrically coupled to the main bus on a first main bus connector line and electrically coupled to the transfer bus on a first transfer bus connector line;
   a second group of battery cells electrically coupled to the main bus on a second main bus connector line and electrically coupled to the transfer bus on a second transfer bus connector line;
   a first switch provided in the first main bus connector line and being operable to connect and disconnect the first group of battery cells to and from the main bus;
   a second switch provided in the second main bus connector line and being operable to connect and disconnect the second group of battery cells to and from the main bus;
   a third switch provided in the first transfer bus connector line and being operable to connect and disconnect the first group of battery cells to and from the transfer bus;
   a fourth switch provided in the second transfer bus connector line and being operable to connect and disconnect the second group of battery cells to and from the transfer bus; and
   a controller for controlling the position of the first, second, third and fourth switches and the gate bias on the first and second thyristors so as to seamlessly transition power between the first group of battery cells and the second group of battery cells when the groups of battery cells are being discharged and seamlessly transition power between the first group of battery cells and the second group of battery cells when the groups of battery cells are being charged.

2. The system according to claim 1 wherein the controller is configured to control the switches and the thyristors in a control sequence for disconnecting the first battery group from the main bus and connecting the second group of battery cells to the main bus during a discharging operation when a voltage of the first group of battery cells is less than a voltage of the second group of battery cells, said control sequence including closing the third switch to connect the first group of battery cells to the transfer bus, applying the gate bias to the second thyristor to allow current flow from the first group of battery cells to the main bus through the transfer bus and the second thyristor, opening the first switch to disconnect the first group of battery cells from the main bus, closing the second switch to connect the second group of battery cells to the main bus, opening the third switch to disconnect the first group of battery cells from the transfer bus and removing the gate bias to the first thyristor.

3. The system according to the claim 1 wherein the controller is configured to control the switches and the thyristors in a control sequence for disconnecting the first battery group from the main bus and connecting the second group of battery cells to the main bus during a charging operation when a voltage of the first group of battery cells is greater than a voltage of the second group of battery cells, said control sequence including closing the third switch to connect the first group of battery cells to the transfer bus, applying the gate bias the first thyristor to allow current flow from the main bus to the first group of battery cells through the transfer bus, opening the first switch to disconnect the first group of battery cells from the main bus, closing the second switch to connect the second group of battery cells to the main bus, opening the third switch to disconnect the first group of battery cells from the transfer bus and removing the gate bias to the first thyristor.

4. The method according to claim 1 wherein the controller is configured to control the switches and the thyristors in a control sequence for disconnecting the first battery group from the main bus and connecting the second group of battery cells to the main bus during a discharging operation when a voltage of the first group of battery cells is greater than a voltage of the second group of battery cells, said control sequence including closing the fourth switch to connect the second group of battery cells to the transfer bus, applying the gate bias to the second thyristor, opening the first switch to disconnect the first group of battery cells from the main bus, closing the second switch to connect the second group of battery cells to the main bus, opening the fourth switch to disconnect the second group of battery cells from the transfer bus and removing the gate bias to the second thyristor.

5. The system according to claim 1 wherein the controller is configured to control the switches and the thyristors in a control sequence for disconnecting the first battery group from the main bus and connecting the second group of battery cells to the main bus during a charging operation when a voltage of the first group of battery cells is less than a voltage of the second group of battery cells, said control sequence including closing the fourth switch to connect the second group of battery cells to the transfer bus, applying the gate bias to the first thyristor, opening the first switch to disconnect the first group of battery cells from the main bus, closing the second switch to connect the second group of battery cells to the main bus, opening the fourth switch to disconnect the second group of battery cells from the transfer bus and removing the gate bias to the first thyristor.

6. The system according to claim 1 wherein the controller is configured to control the switches and the thyristors in a control sequence for disconnecting the first battery group from the main bus and connecting the second group of battery cells to the main bus during a discharging operation when a voltage of the first group of battery cells is less than a voltage of the second group of battery cells, said control sequence including closing the third switch to connect the first group of battery cells to the transfer bus, applying the gate bias to both the first and second thyristors, opening the first switch to disconnect the first group of battery cells from the main bus, removing the gate bias voltages to the first and second thyristors, closing the second switch to connect the second group of battery cells to the main bus, and opening the third switch to disconnect the first group of battery cells from the transfer bus.

7. The system according to claim 1 wherein the controller is configured to control the switches and the thyristors in a control sequence for disconnecting the first battery group from the main bus and connecting the second group of battery cells to the main bus during a charging operation when a voltage of the first group of battery cells is greater than a voltage of the second group of battery cells, said control sequence including closing the third switch to connect the first group of battery cells to the transfer bus, applying the gate bias to both the first and second thyristors, opening the first switch to disconnect the first group of battery cells from the main bus, removing the gate bias to the first and second thyristors, closing the second switch to connect the second group of battery cells to the main bus, and opening the third switch to disconnect the first group of battery cells from the transfer bus.

8. The system according to claim 1 wherein the main bus is electrically coupled to a power inverter that converts DC discharging current to AC current and converts AC charging current to DC current.

9. The system according to claim 1 wherein the battery cells are lithium-ion battery cells.

10. The system according to claim 1 wherein the system is a grid scale energy storage system that provides power to a medium voltage power distribution network.

11. An energy storage system comprising:
a main bus;
a transfer bus;
a pair of anti-parallel thyristors electrically coupled to the main bus and the transfer bus;
a first group of battery cells electrically coupled to the main bus and the transfer bus;
a second group of battery cells electrically coupled to the main bus and the transfer bus;
a switching network including a plurality of switches that selectively connect the first and second groups of battery cells to the main bus and the transfer bus; and
a controller for controlling the position of the switches and a bias voltage applied to the thyristors so as to seamlessly transition power between the first group of battery cells and the second group of battery cells when the group of battery cells are being discharged and seamlessly transition power between the first group of battery cells and the second group of battery cells when the battery cells are being charged.

12. The system according to claim 11 wherein the controller is configured to control the switches and the thyristors in a control sequence for disconnecting the first battery group from the main bus and connecting the second group of battery cells to the main bus during a discharging operation when a voltage of the first group of battery cells is less than a voltage of the second group of battery cells, said control sequence including closing all of the switches that connect the first group of battery cells to the transfer bus, applying the bias voltage to one of the thyristors to allow current flow from the first group of battery cells to the main bus through the transfer bus and the thyristor, opening all of the switches that disconnect the first group of battery cells from the main bus, closing all of the switches that connect the second group of battery cells to the main bus, opening all of the switches that disconnect the first group of battery cells from the transfer bus and removing the gate bias to the thyristors.

13. The system according to the claim 11 wherein the controller is configured to control the switches and the thyristors in a control sequence for disconnecting the first battery group from the main bus and connecting the second group of battery cells to the main bus during a charging operation when a voltage of the first group of battery cells is greater than a voltage of the second group of battery cells, said control sequence including closing all of the switches that connect the first group of battery cells to the transfer bus, applying the bias voltage to one of the thyristors to allow current flow from the main bus to the first group of battery cells through the transfer bus, opening all of the switches that disconnect the first group of battery cells from the main bus, closing all of switches that connect the second group of battery cells to the main bus, opening all of the switches that disconnect the first group of battery cells from the transfer bus and removing the bias voltage to the thyristors.

14. The method according to claim 11 wherein the controller is configured to control the switches and the thyristors in a control sequence for disconnecting the first battery group from the main bus and connecting the second group of battery cells to the main bus during a discharging operation when a voltage of the first group of battery cells is greater than a voltage of the second group of battery cells, said control sequence including closing all of the switches that connect the second group of battery cells to the transfer bus, applying the bias voltage to one of the thyristors, opening all of the switches that disconnect the first group of battery cells from the main bus, closing all of the switches that connect the second group of battery cells to the main bus, opening all of the switches that disconnect the second group of battery cells from the transfer bus and removing the bias voltage to the thyristors.

15. The system according to claim 11 wherein the controller is configured to control the switches and the thyristors in a control sequence for disconnecting the first battery group from the main bus and connecting the second group of battery cells to the main bus during a charging operation when a voltage of the first group of battery cells is less than a voltage of the second group of battery cells, said control sequence including closing all of the switches that connect the second group of battery cells to the transfer bus, applying the bias voltage to one of the thyristors, opening all of the switches that disconnect the first group of battery cells from the main bus, closing all of the switches that connect the second group of battery cells to the main bus, opening all of the switches that disconnect the second group of battery cells from the transfer bus and removing the bias voltage to the thyristors.

16. The system according to claim 11 wherein the controller is configured to control the switches and the thyristors in a control sequence for disconnecting the first battery group from the main bus and connecting the second group of battery cells to the main bus during a discharging operation when a voltage of the first group of battery cells is less than a voltage of the second group of battery cells, said control sequence including closing all of the switches that connect the first group of battery cells to the transfer bus, applying the bias voltage to both of the thyristors, opening all of the switches that disconnect the first group of battery cells from the main bus, removing the bias voltages to the thyristors, closing all of the switches that connect the second group of battery cells to the main bus, and opening all of the switches that disconnect the first group of battery cells from the transfer bus.

17. The system according to claim 11 wherein the controller is configured to control the switches and the thyristors in a control sequence for disconnecting the first battery group from the main bus and connecting the second group of battery cells to the main bus during a charging operation when a voltage of the first group of battery cells is greater than a voltage of the second group of battery cells, said control sequence including closing all of the switches that connect the first group of battery cells to the transfer bus, applying the bias voltage to both of the thyristors, opening all of the switches that disconnect the first group of battery cells from the main bus, removing the bias voltages to the thyristors, closing all of the switches that connect the second group of battery cells to the main bus, and opening all of the switches that disconnect the first group of battery cells from the transfer bus.

18. The system according to claim 11 wherein the battery cells are lithium-ion battery cells.

19. The system according to claim 11 wherein the system is a grid scale energy storage system that provides power to a medium voltage power distribution network.

20. The system according to claim 11 wherein the main bus is electrically coupled to a power inverter that converts DC discharging current to AC current and converts AC charging current to DC current.

* * * * *